(12) United States Patent
Kuzu et al.

(10) Patent No.: US 11,842,661 B2
(45) Date of Patent: Dec. 12, 2023

(54) CONTROL METHOD AND INFORMATION DISPLAY SYSTEM

(71) Applicant: Panasonic Intellectual Property Management Co., Ltd., Osaka (JP)

(72) Inventors: Kazuki Kuzu, Tokyo (JP); Koki Doi, Aichi (JP); Masakazu Nakazawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/947,777

(22) Filed: Sep. 19, 2022

(65) Prior Publication Data
US 2023/0100504 A1 Mar. 30, 2023

(30) Foreign Application Priority Data

Sep. 28, 2021 (JP) ................. 2021-158363

(51) Int. Cl.
*G09G 3/00* (2006.01)
*G06F 3/01* (2006.01)
(Continued)

(52) U.S. Cl.
CPC ............. *G09G 3/002* (2013.01); *B60K 35/00* (2013.01); *G02B 27/0093* (2013.01);
(Continued)

(58) Field of Classification Search
CPC ............... G09G 3/002; G09G 2354/00; G09G 2380/10; B60K 35/00; B60K 2370/1529; B60K 2370/166; B60K 2370/167; B60K 2370/52; B60K 2370/194; B60K 2370/186; B60K 2370/1868; B60K 2370/1876; B60K 2370/736; G02B 27/0093; G06F 3/013; B60Q 2300/23; B60W 2050/146;
(Continued)

(56) References Cited

U.S. PATENT DOCUMENTS

| 2017/0015198 A1* | 1/2017 | Suzuki ................. B60K 35/00 |
| 2020/0051529 A1* | 2/2020 | Higashiyama ..... G02B 27/0101 |
| 2022/0130296 A1* | 4/2022 | Kamiya ................ B60K 35/00 |

FOREIGN PATENT DOCUMENTS

| JP | 2002-019491 | 1/2002 |
| JP | 6281376 | 2/2018 |

* cited by examiner

*Primary Examiner* — Douglas M Wilson
(74) *Attorney, Agent, or Firm* — Greeblum & Bernstein, P.L.C.

(57) ABSTRACT

A control method is performed by an information display system displaying information on one or more display units included in a vehicle. The information display system executes guidance processing for guiding a line of sight of a driver of the vehicle toward a display unit which is not in the line of sight. The control method including: obtaining vicinity information indicating a state of vicinity of the vehicle from a device outside the vehicle; determining whether or not the driver should pay more attention to the state of the vicinity indicated in the vicinity information than the information displayed on the one or more display units; and executing control for suppressing the guidance processing when it is determined that the driver should pay more attention to the state of the vicinity than the information displayed on the one or more display units.

8 Claims, 6 Drawing Sheets

(51) Int. Cl.
*B60K 35/00* (2006.01)
*G02B 27/00* (2006.01)
*B60W 50/14* (2020.01)

(52) U.S. Cl.
CPC ...... *G06F 3/013* (2013.01); *B60K 2370/1529* (2019.05); *B60K 2370/166* (2019.05); *B60K 2370/167* (2019.05); *B60K 2370/186* (2019.05); *B60K 2370/1868* (2019.05); *B60K 2370/1876* (2019.05); *B60K 2370/194* (2019.05); *B60K 2370/52* (2019.05); *B60K 2370/736* (2019.05); *B60Q 2300/23* (2013.01); *B60W 2050/146* (2013.01); *B60W 2420/40* (2013.01); *B60W 2420/52* (2013.01); *B60W 2420/54* (2013.01); *B60W 2540/225* (2020.02); *G09G 2354/00* (2013.01); *G09G 2380/10* (2013.01)

(58) Field of Classification Search
CPC ......... B60W 2420/40; B60W 2420/52; B60W 2420/54; B60W 2540/225; B60W 50/14
See application file for complete search history.

FIG. 7

|  | Center display | Head-up display | Meter-system display |
|---|---|---|---|
| Displayed information | Audio | Blind spot | D position |
| Priority | 6 | 1 | 4 |

FIG. 8

|  | Center display | Head-up display | Meter-system display |
|---|---|---|---|
| Displayed information | Rear-view monitor | Empty mark | R position |
| Priority | 2 | 5 | 4 |

CONTROL METHOD AND INFORMATION DISPLAY SYSTEM

CROSS REFERENCE TO RELATED APPLICATION

The present application is based on and claims priority of Japanese Patent Application No. 2021-158363 filed on Sep. 28, 2021.

FIELD

The present disclosure relates to a control method and an information display system.

BACKGROUND

Vehicles equipped with display units are known. The display units include, for example, a center display that functions as a display unit of a navigation device or an audio device, a meter-system display that displays information such as the vehicle speed and the engine speed, and a head-up display that projects information onto the windshield (e.g., see Patent Literature 1).

The above display units each display a different type of information. The information displayed on the display units includes important information relevant to the occupants' safety, information utilized for driving the vehicle, information for convenience or comfort, and information related to the occupants' interest or preference.

CITATION LIST

Patent Literature

PTL 1: Japanese Unexamined Patent Application Publication No. 2002-19491

SUMMARY

However, the head-up display according to Patent Literature (PTL) 1 can be improved upon.

In view of this, the present disclosure provides a control method capable of improving upon the above related art.

In accordance with an aspect of the present disclosure, a control method is performed by an information display system that displays information on one or more display units included in a vehicle, the information display system executing guidance processing for guiding a line of sight of a driver of the vehicle toward a display unit which is not in the line of sight among the one or more display units, the control method including: obtaining vicinity information indicating a state of vicinity of the vehicle from a device outside the vehicle; determining whether or not the driver should pay more attention to the state of the vicinity of the vehicle indicated in the vicinity information than the information displayed on the one or more display units; and executing control for suppressing the execution of the guidance processing when it is determined in the determining that the driver should pay more attention to the state of the vicinity of the vehicle than the information displayed on the one or more display units.

It should be noted that general or specific aspects of the present disclosure may be implemented to a system, a device, a method, an integrated circuit, a computer program, a non-transitory computer-readable recording medium such as a Compact Disc-Read Only Memory (CD-ROM), or any given combination thereof.

The control method according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 7 is an illustrative diagram illustrating a first example of priority setting in the embodiment.

FIG. 8 is an illustrative diagram illustrating a second example of priority setting in the embodiment.

Figure 1:
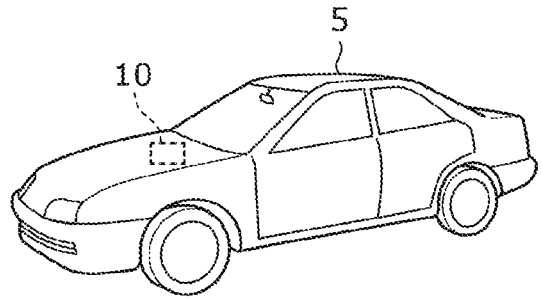
FIG. 1 is an illustrative diagram that schematically illustrates an external view of a vehicle in an embodiment.

DESCRIPTION OF EMBODIMENT (Observations Under which the Present Disclosure was Conceived)

The inventors have found the following problem related to the head-up display described in the above "Background".

When different display units each display a different type of information, what the driver should recognize first would be important information more relevant to safety. The driver, however, does not necessarily view the display unit displaying the important information that should be recognized.

For an information display system in which different display units each display a different type of information, it is contemplated to give priority to a display unit displaying important information that should be recognized, thereby causing the driver to view that display unit.

In some situations, however, causing the driver to view any display unit may not be appropriate.

In the light of the above, the present disclosure provides a control method that causes the driver to view a display unit in a more appropriate situation. In accordance with an aspect of the present disclosure, a control method is performed by an information display system that displays information on one or more display units included in a vehicle, the information display system executing guidance processing for guiding a line of sight of a driver of the vehicle toward a display unit which is not in the line of sight among the one or more display units, the control method including: obtaining vicinity information indicating a state of vicinity of the vehicle from a device outside the vehicle; determining whether or not the driver should pay more attention to the state of the vicinity of the vehicle indicated in the vicinity information than the information displayed on the one or more display units; and executing control for suppressing the execution of the guidance processing when it is determined in the determining that the driver should pay more attention to the state of the vicinity of the vehicle than the information displayed on the one or more display units.

According to the above aspect, there is a possibility that the information display system suppresses the execution of the guidance processing in a situation in which the driver should pay more attention to the state of the vicinity of the vehicle than to the information displayed on the display units, which makes it possible to prevent the driver from paying more attention to the display units than to the state of the vicinity of the vehicle. In other situations, there is a possibility that the information display system can execute the guidance processing to appropriately guide the driver's line of sight toward a display unit. Thus, there is a possibility that the information display system can cause the driver to view a display unit in a more appropriate situation.

For example, it is possible that the vicinity information includes position information of the vehicle, the determining includes: determining whether or not the position information indicates that a position of the vehicle is within a predetermined caution area; and determining that the driver should pay more attention to the state of the vicinity of the vehicle than the information displayed on the one or more display units, when it is determined that the position information indicates that the position of the vehicle is within the predetermined caution area.

According to the above aspect, there is a possibility that the information display system suppresses the execution of the guidance processing when the vehicle is in the predetermined caution area, which makes it possible to prevent the driver from paying attention to a display unit while in the caution area. Furthermore, there is a possibility that, when the vehicle is not in the predetermined caution area, the information display system can execute the guidance processing to appropriately guide the driver's line of sight toward a display unit. Thus, there is a possibility that the information display system can cause the driver to view a display unit in a more appropriate situation, which is when the vehicle is not in the caution area.

For example, it is possible that the predetermined caution area includes an area within a predetermined distance from at least one of an intersection, a pedestrian crossing, or a railroad crossing.

According to the above aspect, there is a possibility that the information display system can suppress the execution of the guidance processing when the vehicle is in the predetermined caution area that includes an intersection, a pedestrian crossing, or a railroad crossing. Thus, there is a possibility that the information display system can more readily cause the driver to view a display unit in a more appropriate situation, which is when the vehicle is not in the caution area.

For example, it is possible that the vicinity information includes detection information obtained by a sensor provided in the vehicle, the determining includes: determining whether or not the detection information indicates that an object or a person is present in the vicinity of the vehicle; and determining that the driver should pay more attention to the state of the vicinity of the vehicle than the information displayed on the one or more display units, when it is determined that the detection information indicates that an object or a person is present in the vicinity of the vehicle.

According to the above aspect, there is a possibility that the information display system suppresses the execution of the guidance processing when an object or a person is present in the vicinity the vehicle, which makes it possible to prevent the driver from paying more attention to a display unit than to the object or the person. Furthermore, there is a possibility that, when no object or person is present in the vicinity the vehicle, the information display system can execute the guidance processing to appropriately guide the driver's line of sight toward a display unit. Thus, there is a possibility that the information display system can cause the driver to view a display unit in a more appropriate situation, which is when no object or person is present in the vicinity the vehicle.

For example, it is possible that the control method further includes: detecting the line of sight of the driver, wherein the guidance processing includes display processing for displaying, on at least one of the one or more display units, an image for causing the driver to pay attention to an object or a person which is present at a position which is outside the vehicle and out of the line of sight of the driver, and the executing of the control is prohibited during the display processing even when it is determined in the determining that the driver should pay more attention to the state of the vicinity of the vehicle than the information displayed on the one or more display units.

According to the above aspect, there is a possibility that, if the guidance processing includes display processing, the information display system prohibits the suppression of the execution of the guidance processing, i.e., executes the guidance processing, to cause the driver to pay attention to an object or a person outside the vehicle. The display processing is thus executed because it may contribute to effectively causing the driver to pay attention to the object or the person outside the vehicle. Thus, there is a possibility that the information display system can cause the driver to view a display unit in a more appropriate situation.

For example, it is possible that the display processing includes processing for projecting, at or in a vicinity of a position on a windshield of the vehicle where the driver sees the object or the person present ahead of the vehicle through the windshield, the image for causing the driver to pay attention to the object or the person.

According to the above aspect, there is a possibility that the information display system can prohibit the suppression of the execution of the guidance processing if the guidance processing includes display processing that involves processing for projecting an image onto the windshield of the vehicle. Thus, there is a possibility that the information display system can cause the driver to view a display unit in a more appropriate situation.

For example, it is possible that the information display system repeatedly executes the guidance processing until the line of sight of the driver is directed to the display unit which is not in the line of sight of the driver among the one or more display units, and the control method further comprises suppressing the execution of the guidance processing when the guidance processing has been repeatedly executed for a predetermined time period or longer.

According to the above aspect, there is a possibility that, during continuous execution of the guidance processing, the information display system can suppress the execution of the guidance processing if the duration of the guidance processing reaches a predetermined time period. The driver may be gazing at an object different from a display unit toward which the guidance processing is attempting to guide the driver's line of sight. there is a possibility that continuing the guidance processing by the information display system in such a situation may obstruct the safe driving of the vehicle, and this can be avoided by preventing the execution of the guidance processing. The information display system can thus cause the driver to view a display unit in a more appropriate situation.

In accordance with another aspect of the present disclosure, an information display system displays information on one or more display units included in a vehicle, the information display system including: a guidance processing executor that executes guidance processing for guiding a line of sight of a driver of the vehicle toward a display unit which is not in the line of sight among the one or more display units; and an external information obtainer that obtains vicinity information indicating a state of vicinity of the vehicle from a device outside the vehicle, wherein the guidance processing executor: determines whether or not the driver should pay more attention to the state of the vicinity of the vehicle indicated in the vicinity information than the information displayed on the one or more display units; and executes control for suppressing the execution of the guidance processing when the guidance processing executor determines that the driver should pay more attention to the state of the vicinity of the vehicle than the information displayed on the one or more display units.

According to the above aspect, the same advantageous effects as in the above-described control method are achieved.

In accordance with still another aspect of the present disclosure, a program causes a computer to execute the above-described control method.

According to the above aspect, the same advantageous effects as in the above-described control method are achieved.

It should be noted that general or specific aspects of the present disclosure may be implemented to a system, a device, a method, an integrated circuit, a computer program, a non-transitory computer-readable recording medium such as a Compact Disc-Read Only Memory (CD-ROM), or any given combination thereof.

Hereinafter, certain exemplary embodiments will be described in detail with reference to the accompanying Drawings.

The following embodiments are general or specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements.

Embodiment

This embodiment will describe aspects such as a control method that causes a driver to view a display unit in a more appropriate situation.

FIG. 1 is an illustrative diagram that schematically illustrates an external view of vehicle 5 in this embodiment.

Vehicle 5 shown in FIG. 1 may be an automobile, for example. Vehicle 5 includes information display system 10 that displays information on one or more display units (not shown) provided in vehicle 5. Although FIG. 1 shows an example in which information display system 10 is disposed under an instrument panel, information display system 10 may be disposed at any position.

Figure 2:
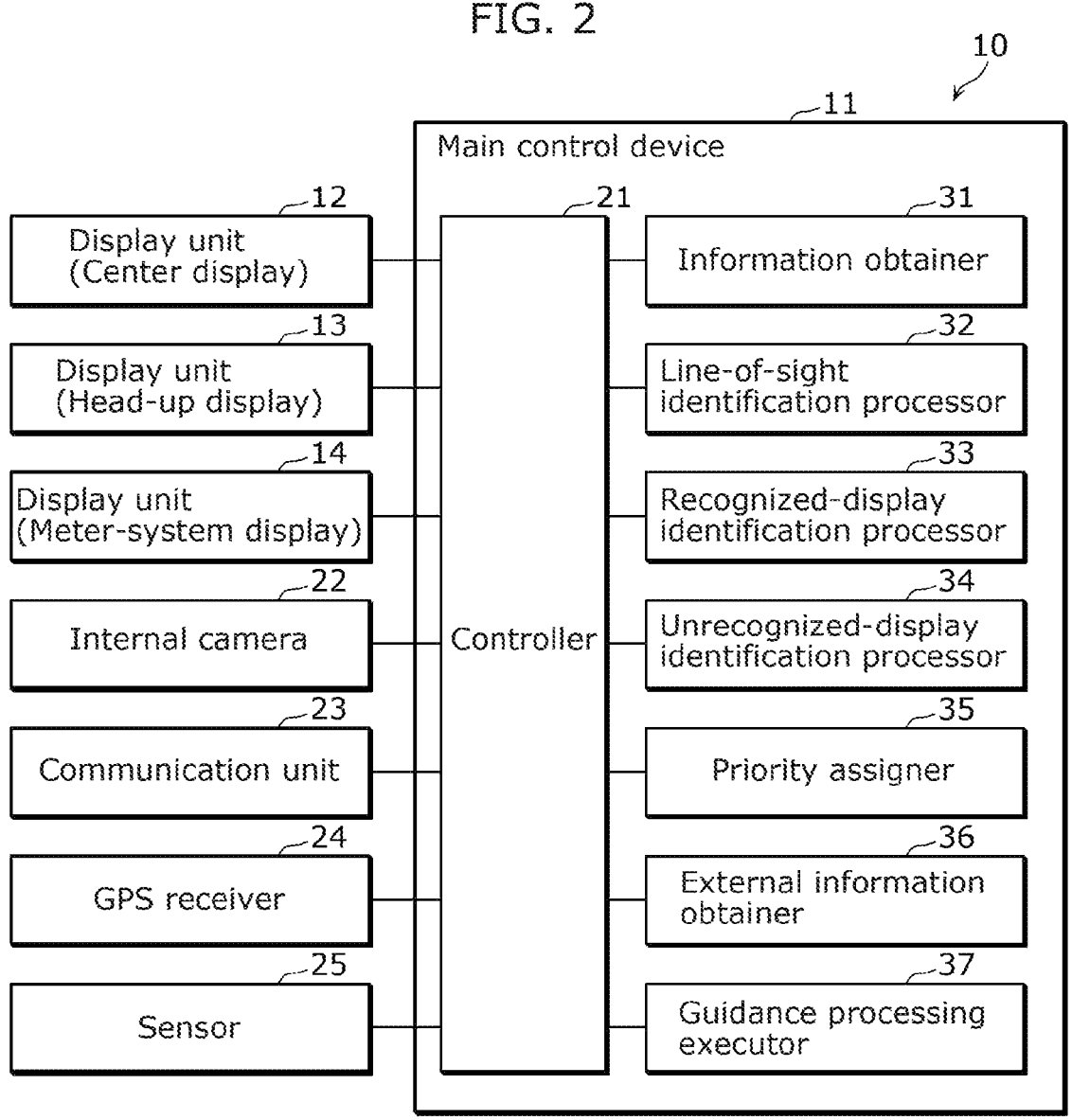
FIG. 2 is a block diagram illustrating the configuration of an information display system in the embodiment.

FIG. 2 is a block diagram illustrating the configuration of information display system 10 in this embodiment.

As shown in FIG. 2, information display system 10 includes main control device 11, display units 12, 13, and 14 (also referred to as display units (12, etc.)), internal camera 22, communication unit 23, global positioning system (GPS) receiver 24, and sensor 25. Although three display units (12, etc.) will be described as an example, there may be one or more display units.

Main control device 11 includes controller 21. Internal camera 22, communication unit 23, GPS receiver 24, and sensor 25 are connected to main control device 11. Controller 21 includes a processor (e.g., a central processing unit (CPU)), random access memory (RAM), and read only memory (ROM), and controls the general operation of main control device 11.

Internal camera 22, for example provided in front of the driver's seat in the vehicle, captures images of the driver in the vehicle and outputs the captured data to controller 21.

Communication unit 23, for example including a wireless communication module, performs various sorts of communication by establishing a wireless communication line with an external Internet access point or an external information communication device (not shown).

GPS receiver 24 receives a signal from a GPS satellite, obtains position information indicating the position of vehicle 5 on the earth based on the signal received, and outputs the position information to controller 21. The position information is an example of vicinity information indicating the state of the vicinity of vehicle 5.

Sensor 25 detects an object or a person in the vicinity of vehicle 5, generates detection information indicating the result of the detection, and outputs the detection information to controller 21. Sensor 25 may be a LiDAR (Light Detection and Ranging) sensor, an infrared sensor, or an ultrasound sensor. The range of the vicinity of vehicle 5 depends on the sensor type; it may be within several hundreds of meters for a LiDAR sensor, within several tens to hundreds of meters for an infrared sensor, and within several tens of meters for an ultrasound sensor. The detection information is an example of the vicinity information indicating the state of the vicinity of vehicle 5.

Display units (12, etc.) each display information on a display surface. Display units (12, etc.) may each be a liquid crystal display or an organic EL display, or even a head-up display that projects a displayed image onto windshield F serving as a display surface. Display units (12, etc.) will be described below.

Figure 3:
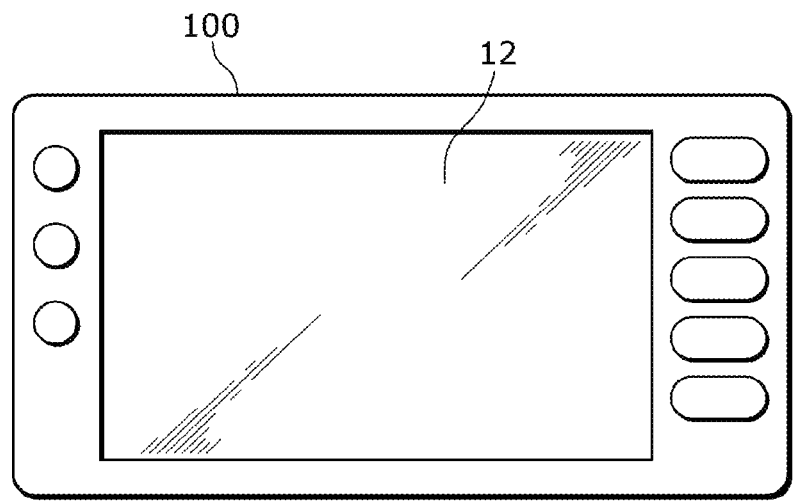
FIG. 3 is an illustrative diagram illustrating a first example of display units in the embodiment.

FIG. 3 is an illustrative diagram illustrating display unit 12, which is a first example of display units in this embodiment.

As illustrated in FIG. 3, display unit 12 is a center display that functions as a display unit of in-vehicle device 100 provided in vehicle 5. In-vehicle device 100 may be a navigation device or an audio device, for example. When vehicle 5 is backed, display unit 12 displays an image captured by a rear camera (not shown). Display unit 12 can thus function as what is called a rear-view monitor.

Figure 4:
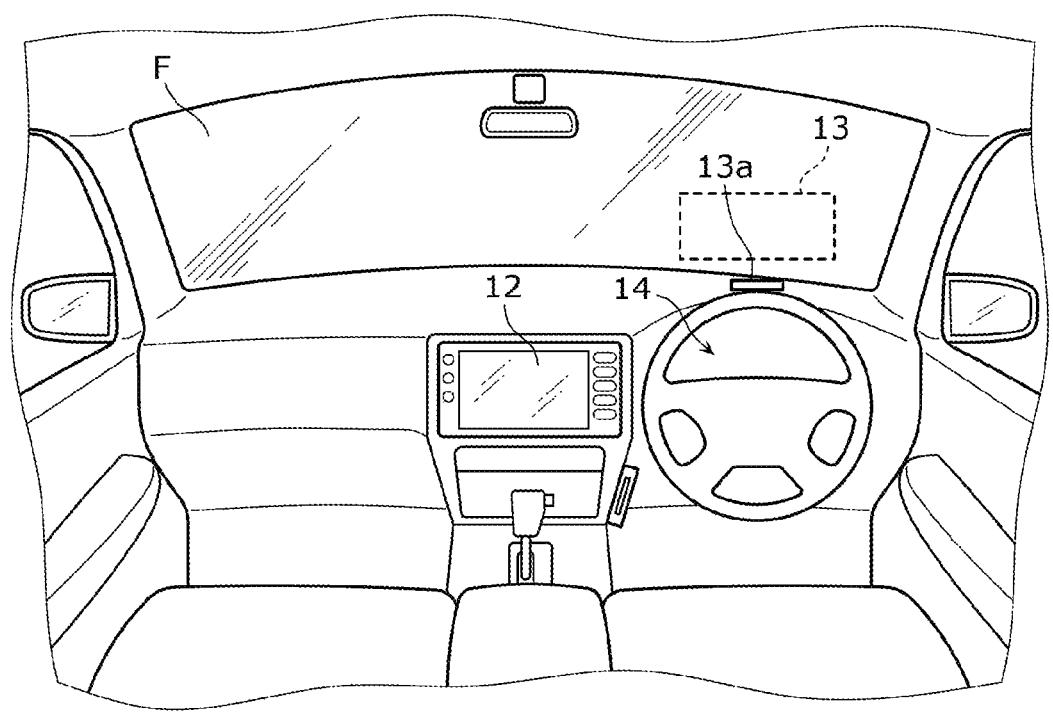
FIG. 4 is an illustrative diagram illustrating a second example of the display units in the embodiment.
Figure 5:
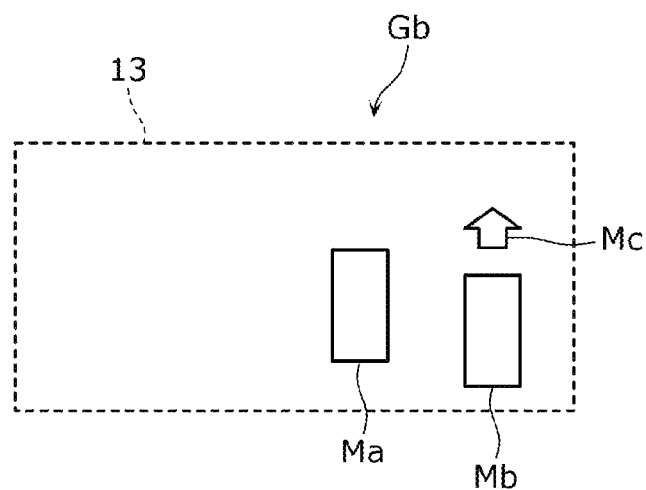
FIG. 5 is an illustrative diagram illustrating a blind spot screen in the embodiment.

FIG. 4 is an illustrative diagram illustrating display unit 13, which is a second example of the display units in this embodiment. FIG. 5 is an illustrative diagram illustrating blind spot screen Gb in this embodiment.

As illustrated in FIG. 4, display unit 13 is a head-up display that displays information on windshield F of vehicle 5. Display unit 13 is implemented by display unit 13a provided in the instrument panel of vehicle 5 and projecting information onto windshield F. Various sorts of information can be displayed on display unit 13, for example blind spot screen Gb illustrated in FIG. 5 and an empty mark (not shown).

Blind spot screen Gb shows the situation on the rear left and rear right of vehicle 5 based on captured data generated by cameras (not shown) provided at a leftward position and a rightward position on vehicle 5. Blind spot screen Gb displays marks such as own-vehicle mark Ma that schematically indicates this vehicle, other-vehicle mark Mb that schematically indicates another vehicle located on the rear left or rear right of this vehicle, and moving direction mark Mc that indicates the moving direction of the other vehicle.

The empty mark indicates that the remaining fuel is insufficient.

Display unit 13 may span the entire windshield F.

Figure 6:
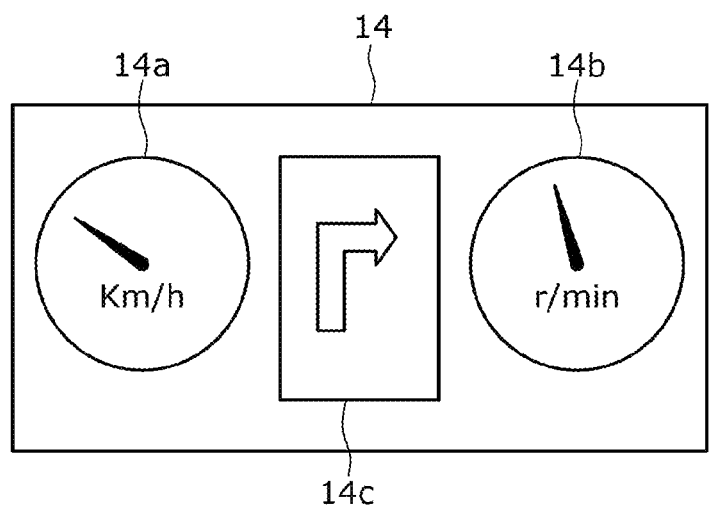
FIG. 6 is an illustrative diagram illustrating a third example of the display units in the embodiment.

FIG. 6 is an illustrative diagram illustrating display unit 14, which is a third example of the display units in this embodiment.

As illustrated in FIG. 6, display unit 14 is a meter-system display that displays the speed of vehicle 5 and the engine speed, for example. Display unit 14 has display block 14a that shows the speed of vehicle 5, and display block 14b that shows the engine speed. Display unit 14 also has display block 14c between display blocks 14a and 14b. Display block 14c may be implemented by a liquid crystal display, for example. Display block 14c can show a figure indicating the direction to be taken at a branch point such as an intersection (e.g., a right-pointing arrow for right turn, or a left-pointing arrow for left turn). Display block 14c can thus function as a display unit corresponding to what is called a turn-by-turn function. Display block 14c can also show the gear position currently selected.

Main control device 11 causes controller 21 to execute a control program to implement the following processors in software: information obtainer 31, line-of-sight identification processor 32, recognized-display identification processor 33, unrecognized-display identification processor 34, priority assigner 35, external information obtainer 36, and guidance processing executor 37. Alternatively, these processors may be implemented in hardware, for example as an integrated circuit incorporated into controller 21.

Information obtainer 31 obtains information displayed on each of display units (12, etc.). That is, information obtainer 31 obtains data for identifying the content displayed on display units (12, etc.).

Line-of-sight identification processor 32 identifies the driver's line of sight. That is, line-of-sight identification processor 32 identifies the driver's line of sight by performing known line-of-sight analysis for identifying the driver's line of sight. Specifically, line-of-sight identification processor 32 obtains the positions of the driver's eyeballs from captured data generated by internal camera 22. From the positions of the eyeballs obtained, line-of-sight identification processor 32 identifies the driver's line of sight based on the movement or state of the eyeballs. Line-of-sight identification processor 32 can further identify the driver's gaze point, i.e., the position at which the driver is gazing, based on the driver's line of sight identified.

Recognized-display identification processor 33 identifies, as a recognized display unit, one of display units (12, etc.) within which the driver's line of sight identified by line-of-sight identification processor 32 falls (in other words, a display unit in the driver's line of sight), which is a display unit in the driver's line-of-sight direction. That is, recognized-display identification processor 33 monitors the driver's line of sight identified by line-of-sight identification processor 32 to check whether it is directed to any of display units (12, etc.), or in other words, whether the driver's gaze point is on any of display units (12, etc.). If the driver's line of sight is directed to any of display units (12, etc.), or in other words, if the driver's gaze point is within the display surface of any of display units (12, etc.), recognized-display identification processor 33 determines that the driver's line of sight falls within the display unit and identifies the display unit as the recognized display unit.

Further, when the driver's line of sight identified by line-of-sight identification processor 32 falls within one of display units (12, etc.), recognized-display identification processor 33 identifies the display unit as the recognized display unit if the display unit displays information. That is, if the driver's line of sight falls within one of display units (12, etc.) displaying no information, recognized-display identification processor 33 does not set the display unit as the recognized display unit.

Of display units (12, etc.), the display unit identified as the recognized display unit is set as the display unit viewed and recognized by the driver. A storage medium (not shown) in main control device 11 has stored therein display unit attribute data for identifying attributes, such as the installment position in the vehicle, size, and shape, of each of display units (12, etc.) in advance. Recognized-display identification processor 33 determines whether the driver's line of sight falls within a display unit by matching the display unit attribute data with vector data indicating the direction of the driver's line of sight identified by line-of-sight identification processor 32, or with position coordinate data indicating the driver's gaze point.

Unrecognized-display identification processor 34 identifies, as unrecognized display units, those of display units (12, etc.) not identified as the recognized display unit. The display units identified as the unrecognized display units are set as display units not viewed or recognized by the driver.

Based on information displayed on the display units set as the unrecognized display units, priority assigner 35 assigns priority to the unrecognized display units. Examples of priority setting will be described.

FIG. 7 is an illustrative diagram illustrating a first example of priority setting in this embodiment.

The example illustrated in FIG. 7 shows priority setting in a case in which vehicle 5 is driven forward. In this case, priority assigner 35 assigns priority "6" to display unit 12 displaying the audio screen, priority "1" to display unit 13 displaying the blind spot screen, and priority "4" to display unit 14 displaying D position as the gear position.

Thus, in normal driving mode in which vehicle 5 is driven forward, the blind spot screen is important information relevant to the safe driving of vehicle 5. Priority assigner 35 therefore assigns high priority to display unit 13 displaying that information. By contrast, the audio screen is information not highly relevant to the safe driving of vehicle 5. Priority assigner 35 therefore assigns low priority to display unit 12 displaying that information. Smaller priority numbers represent higher priority, and priority "1" is the highest.

FIG. 8 is an illustrative diagram illustrating a second example of priority setting in this embodiment.

The example illustrated in FIG. 8 shows priority setting in a case in which vehicle 5 is backed. In this case, priority assigner 35 assigns priority "2" to display unit 12 displaying the rear-view monitor screen, priority "5" to display unit 13 displaying the empty mark, and priority "4" to display unit 14 displaying R position as the gear position.

Thus, when vehicle 5 is backed, the rear-view monitor screen is important information relevant to the safe driving of vehicle 5. Priority assigner 35 therefore assigns high priority to display unit 12 displaying that information. By contrast, the empty mark is information not highly relevant to the safe driving of vehicle 5. Priority assigner 35 therefore assigns low priority to display unit 13 displaying that information.

Alternatively, priority assigner 35 may assign priority to the information (content) itself displayed on the unrecognized display units.

External information obtainer 36 obtains vicinity information that indicates the state of the vicinity of vehicle 5. As the vicinity information, external information obtainer 36 obtains position information obtained by GPS receiver 24, or detection information obtained by sensor 25.

Upon completion of the assignment of priority by priority assigner 35, guidance processing executor 37 determines whether the driver's line of sight identified by line-of-sight identification processor 32 falls within an unrecognized display unit assigned with a high priority. The high priority may be the highest priority, for example. If it is determined that the driver's line of sight does not fall within an unrecognized display unit assigned with a high priority, i.e., if the driver's line of sight is not directed to the unrecognized display unit, guidance processing executor 37 executes guidance processing for guiding the driver's line of sight toward the unrecognized display unit.

If priority assigner 35 has assigned priority to the information itself displayed on the unrecognized display units, guidance processing executor 37 may execute the guidance processing if the driver's line of sight is not directed to a display unit displaying information assigned with a high priority.

Guidance processing executor 37 also determines whether the driver should pay more attention to the state of the vicinity of vehicle 5 indicated by the vicinity information than to information displayed on display units (12, etc.). If it is determined that the driver should pay more attention to the state of the vicinity of vehicle 5 than to information displayed on display units (12, etc.), guidance processing executor 37 executes control for suppressing the execution of the guidance processing.

Here, if the vicinity information includes position information on vehicle 5, guidance processing executor 37 makes the above determination as follows. If it is determined that the position information indicates that vehicle 5 is in a predetermined caution area, guidance processing executor 37 determines that the driver should pay more attention to the state of the vicinity of vehicle 5 than to information displayed on display units (12, etc.). The predetermined caution area is an area that requires the driver to pay attention in driving vehicle 5, for example including an intersection, a pedestrian crossing, or a railroad crossing, or possibly including an area within a predetermined distance from an intersection, a pedestrian crossing, or a railroad crossing. The predetermined caution area may be identified based on identification information (e.g., the latitude and the longitude) that can uniquely identify the area. For example, the identification information may be generated by the provider of information display system 10 and stored in a storage medium (not shown) in main control device 11 in advance. The predetermined distance may be about 3 to 15 m, for example.

If the vicinity information includes detection information, guidance processing executor 37 makes the above determination as follows. If it is determined that the detection information indicates the presence of an object or a person in the vicinity of vehicle 5, guidance processing executor 37 determines that the driver should pay more attention to the state of the vicinity of vehicle 5 than to information displayed on display units (12, etc.).

Guidance processing executor 37 repeatedly executes the guidance processing until the driver's line of sight is directed to one of display units (12, etc.) that is out of the driver's line of sight. However, the execution of the guidance processing may be suppressed when the guidance processing has been repeatedly executed for a predetermined time period or longer. The predetermined time period may be about 5 to 10 seconds, for example.

Now, an example of information display control by information display system 10 will be described.

Figure 9:
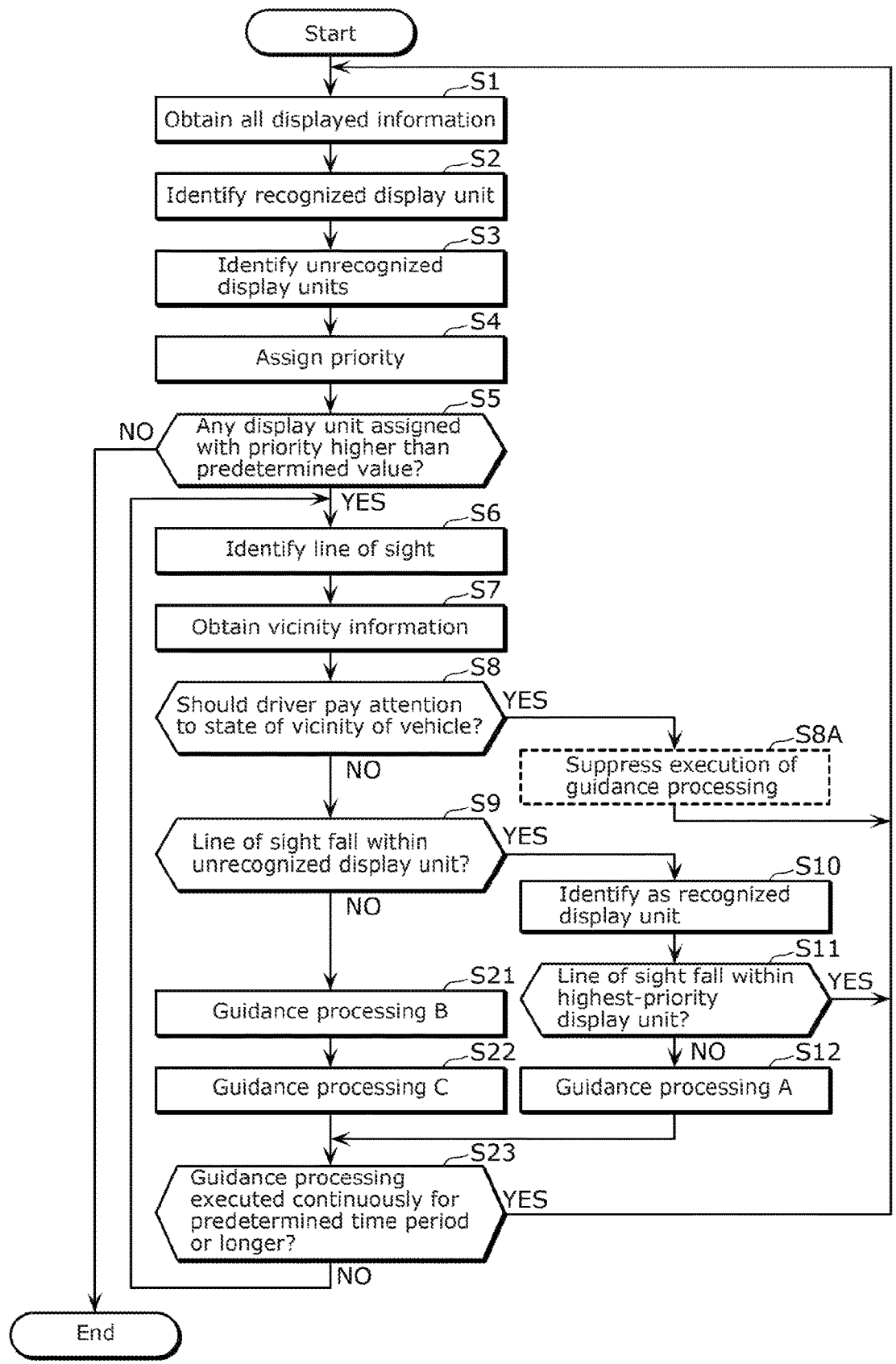
FIG. 9 is a flowchart illustrating an example of control by the information display system in the embodiment.

FIG. 9 is a flowchart illustrating an example of control by information display system 10 in this embodiment.

At step S1, main control device 11 obtains information displayed on display units (12, etc.) provided in vehicle 5.

At step S2, while continually identifying the driver's line of sight, main control device 11 identifies, as a recognized display unit, a display unit within which the driver's line of sight falls.

At step S3, main control device 11 identifies, as unrecognized display units, the display units not identified as the recognized display unit.

At step S4, main control device 11 assigns priority to the unrecognized display units based on information displayed on the unrecognized display units. Priority may be assigned at a set point of time that may be appropriately changed, such as a predetermined time after the start of this control, a predetermined time after the completion of the processing at step S1, or when the content displayed on some of the unrecognized display units is updated.

At step S5, main control device 11 determines whether any display unit is assigned with a priority higher than a preset predetermined value. The predetermined value may be set and appropriately changed with respect to the safety of the occupants of vehicle 5. As an example, the description here assumes that the predetermined value is set to "2."

If main control device 11 determines that no display unit is assigned with a priority higher than the predetermined value (NO at step S5), the process shown in FIG. 9 terminates. If main control device 11 determines that a display unit is assigned with a priority higher than the predetermined value (YES at step S5), the process proceeds to step S6.

At step S6, main control device 11 identifies the driver's line of sight with internal camera 22.

At step S7, main control device 11 obtains vicinity information with GPS receiver 24 or sensor 25.

At step S8, main control device 11 determines whether the driver should pay attention to the state of the vicinity of vehicle 5. If main control device 11 determines that the driver should pay attention to the state of the vicinity of vehicle 5 (YES at step S8), the process proceeds to step S1. If main control device 11 determines that the driver does not need to pay attention to the state of the vicinity of vehicle 5 (NO at step S8), the process proceeds to step S9. In this regard, if main control device 11 determines that the driver should pay attention to the state of the vicinity of vehicle 5, the process skips the execution of guidance processing A (step S12), guidance processing B (step S21), or guidance processing C (step S22) to be described below. This may be expressed as suppressing the execution of guidance processing (step S8A).

At step S9, main control device 11 determines whether the driver's line of sight falls within an unrecognized display unit. Candidate unrecognized display units in the determination at step S9 may be limited to those having priority higher than or equal to a predetermined value, or may also include those having priority lower than the predetermined value. If main control device 11 determines that the driver's line of sight falls within an unrecognized display unit (YES at step S9), the process proceeds to step S10. If main control device 11 determines that the driver's line of sight does not fall within an unrecognized display unit (NO at step S9), the process proceeds to step S21.

At step S10, main control device 11 identifies, as a recognized display unit, the unrecognized display unit within which the driver's line of sight falls.

At step S11, main control device 11 determines whether the driver's line of sight falls within the unrecognized display unit assigned with the highest priority. If main control device 11 determines that the driver's line of sight falls within the unrecognized display unit assigned with the highest priority (YES at step S11), the process proceeds to step S1. If main control device 11 determines that the driver's line of sight does not fall within the unrecognized display unit assigned with the highest priority (NO at step S11), the process proceeds to step S12.

At step S12, main control device 11 executes guidance processing A. In guidance processing A, main control device 11 performs processing of indicating, on the display unit to which the driver's line of sight is directed, the direction in which the unrecognized display unit assigned with the highest priority exists. For example, if the driver's line of sight does not fall within display unit 13 (i.e., the head-up display) displaying the blind spot screen but is directed to display unit 14 (i.e., the meter-system display), main control device 11 may show, in display block 14c on display unit 14, a direction mark indicating the direction in which display unit 13 exists.

Alternatively, in guidance processing A, main control device 11 may show, on the display unit within which the driver's line of sight falls, a simple version of information displayed on the unrecognized display unit assigned with the highest priority. That is, main control device 11 identifies the display unit to which the driver's line of sight is currently directed, and, on the display unit identified, shows a simple version of information displayed on the unrecognized display unit assigned with the highest priority. For example, if the driver's line of sight does not fall within display unit 13 displaying the blind spot screen but is directed to display unit 12 (i.e., the center display), main control device 11 may show, on display unit 12, information that represents simplified content of the blind spot screen, for example text information "A vehicle is on the rear right." Upon completion of step S12, the process proceeds to step S23.

At step S21, main control device 11 executes guidance processing B. In guidance processing B, main control device 11 performs processing of outputting, from a speaker (not shown), voice conveying the name of the unrecognized display unit assigned with the highest priority. For example, if the driver's line of sight does not fall within display unit 13 displaying the blind spot screen and is directed to neither of other display units 12 and 14, main control device 11 may output voice information including the name of display unit 13, "Check the head-up display."

At step S22, main control device 11 executes guidance processing C. In guidance processing C, main control device 11 outputs, from the speaker (not shown), voice conveying information displayed on the unrecognized display unit assigned with the highest priority. For example, if the driver's line of sight does not fall within display unit 13 displaying the blind spot screen and is directed to neither of other display units 12 and 14, main control device 11 may output information that represents simplified content of the blind spot screen, for example voice information "A vehicle is on the rear right."

Main control device 11 may execute only one of the processing at step S21 (i.e., guidance processing B) and the processing at step S22 (i.e., guidance processing C).

At step S23, main control device 11 determines whether the guidance processing has been repeatedly executed for a predetermined time period or longer. "Repeatedly executed" here means that step S12 (guidance processing A), step S21 (guidance processing B), and/or step S22 (guidance processing C) are/is repeatedly executed due to step S23 resulting in NO and proceeding to step S6. Main control device 11 calculates the duration of the guidance processing by summing up the durations of guidance processing A, guidance processing B, and guidance processing C executed, and determines whether or not the duration calculated is greater than or equal to the predetermined time period. If main control device 11 determines that the guidance processing has been repeatedly executed for the predetermined time period or longer (YES at step S23), the process proceeds to step S1. If main control device 11 determines that the guidance processing has not been repeatedly executed for the predetermined time period or longer (NO at step S23), the process proceeds to step S6.

The control of suppressing the execution of the guidance processing by guidance processing executor 37 may be prohibited in certain situations. Prohibiting the control of suppressing the execution of the guidance processing means executing the guidance processing. The following will describe prohibiting the control of suppressing the execution of the guidance processing.

Figure 10:
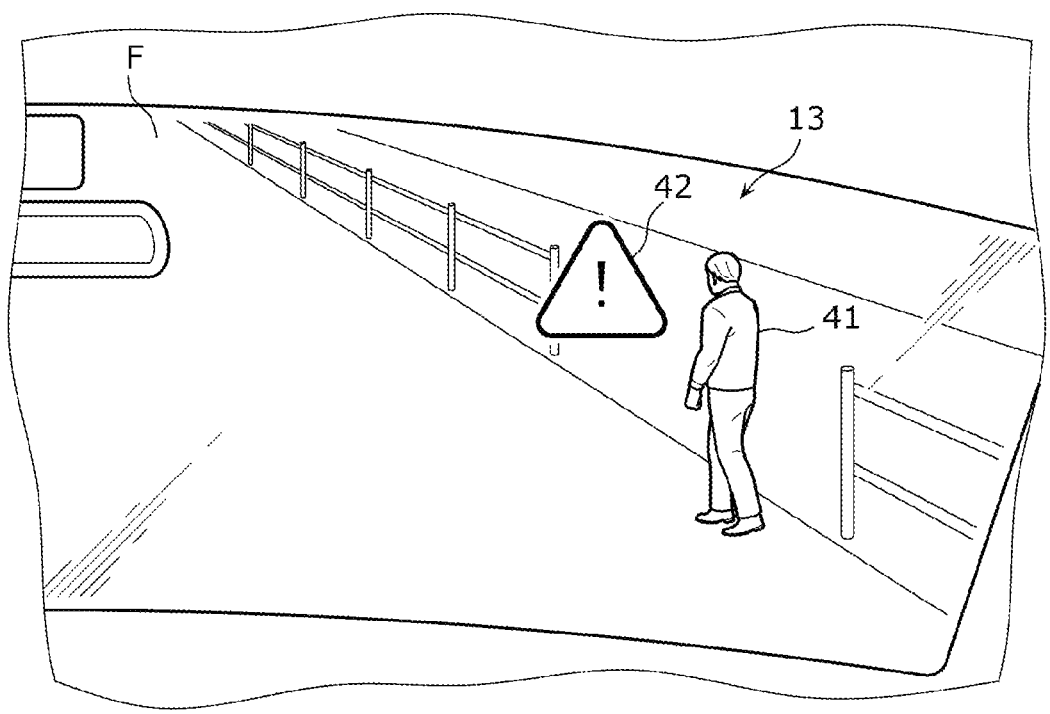
FIG. 10 is an illustrative diagram illustrating an example of guidance processing in the embodiment.

FIG. 10 is an illustrative diagram illustrating an example of the guidance processing in this embodiment.

Guidance processing executor 37 may execute display processing for displaying, on display unit 13 (i.e., the head-up display), an image for causing the driver to pay attention to an object or a person outside vehicle 5 and out of the driver's line of sight. The display processing is included in the guidance processing. The display processing includes processing for projecting, at or near a position on windshield F where the driver sees an object or a person ahead of vehicle 5 through windshield F, image 42 for prompting the driver to pay attention to the object or the person.

FIG. 10 shows a view seen by the driver when person 41 is ahead of vehicle 5. While seeing windshield F, the driver sees person 41 ahead of vehicle 5 through windshield F. The driver also sees image 42 at a position near person 41 on windshield F. The driver is thus expected to view image 42 to drive vehicle 5 with attention to person 41.

In this case, during the execution of the display processing, guidance processing executor 37 may prohibit the control of suppressing the execution of the guidance processing even if it is determined that the driver should pay more attention to the state of the vicinity of vehicle 5 than to information displayed on display units (12, etc.). This is because executing the guidance processing, i.e., executing the display processing, may contribute to effectively causing the driver to pay attention to the presence of person 41.

Guidance processing executor 37 may execute sound output processing for outputting sound for causing the driver to pay attention to an object or a person outside vehicle 5 and out of the driver's line of sight. In this case, during the execution of the sound output processing, guidance processing executor 37 may prohibit the control of suppressing the execution of the guidance processing even if it is determined that the driver should pay more attention to the state of the vicinity of vehicle 5 than to information displayed on display units (12, etc.). This is because executing the guidance processing, i.e., executing the sound output processing, may contribute to effectively causing the driver to pay attention to the presence of person 41.

As above, according to the information display system according to this embodiment, the guidance processing is executed if the driver does not recognize the unrecognized display unit assigned with the highest priority. The guidance processing can guide the driver's line of sight toward the display unit assigned with the highest priority. Thus, a display unit displaying important information that should be recognized can be given priority so that the driver recognizes that display unit.

According to the information display system, when the driver's line of sight falls within one of display units (12, etc.), the display unit is identified as a recognized display unit if the display unit displays information. That is, the driver cannot recognize information by viewing a display unit displaying no information. This embodiment can prevent a display unit displaying no information from being set as a recognized display unit even if the driver views the display unit. This can ensure that the driver recognizes information displayed on a display unit.

According to the information display system, if the driver's line of sight falls within an unrecognized display unit, the unrecognized display unit is identified as a recognized display unit. That is, an unrecognized display unit viewed by the driver at least once is set as a recognized display unit, and repeating this can continually reduce the number of candidate display units for the guidance processing. The driver's line of sight can thus be sequentially guided toward a display unit that has not been viewed by the driver. This can also avoid unnecessarily guiding the driver's line of sight again toward a display unit already recognized by the driver. The ability to sequentially reduce the number of candidate display units for the guidance processing leads to gradually reducing the processing load.

According to the information display system, the guidance processing is executed if an unrecognized display unit is assigned with a priority higher than or equal to a predetermined value. By presetting the predetermined value associated with the safety of the occupants of the vehicle, a display unit displaying important information from a safety viewpoint can be given priority so that the driver's line of sight is guided toward that display unit.

According to the information display system, the guidance processing indicates, on the display unit within which the driver's line of sight falls, the direction in which an unrecognized display unit assigned with a high priority (in the example herein, the highest priority) exists. This enables the driver to smoothly move the driver's line of sight to an unrecognized display unit displaying information that should be recognized.

According to the information display system, the guidance processing shows, on the display unit within which the driver's line of sight falls, a simple version of information displayed on an unrecognized display unit assigned with a high priority (in the example herein, the highest priority). This enables the driver to immediately recognize important information that should be recognized, although in a simplified form.

According to the information display system, the guidance processing outputs voice conveying the name of an unrecognized display unit assigned with a high priority (in the example herein, the highest priority). This enables the driver to immediately hear which display unit displays information that should be recognized, and then smoothly move the driver's line of sight to that display unit.

According to the information display system, the guidance processing outputs voice conveying information displayed on an unrecognized display unit assigned with a high priority (in the example herein, the highest priority). This enables the driver to hear information that should be recognized. For example, the driver may have difficulty in moving the driver's line of sight to a display unit while driving the vehicle. In such a situation, the driver can hear information that should be recognized, thereby keeping safe driving.

According to the information display system, the execution of the guidance processing is suppressed in a situation in which the driver should pay more attention to the state of the vicinity of the vehicle than to information displayed on a display unit. This prevents the driver from paying more attention to a display unit than to the state of the vicinity of the vehicle. In other situations, the information display system can execute the guidance processing to appropriately guide the driver's line of sight toward a display unit. The information display system can thus cause the driver to view a display unit in a more appropriate situation.

According to the information display system, the execution of the guidance processing is suppressed when the vehicle is in a predetermined caution area. This prevents the driver from paying attention to a display unit while in the caution area. When the vehicle is not in the predetermined caution area, the information display system can execute the guidance processing to appropriately guide the driver's line of sight toward a display unit. The information display system can thus cause the driver to view a display unit in a more appropriate situation, which is when the vehicle is not in the caution area.

According to the information display system, the execution of the guidance processing is suppressed when the vehicle is in a predetermined caution area that includes an intersection, a pedestrian crossing, or a railroad crossing. The information display system can thus more readily cause the driver to view a display unit in a more appropriate situation, which is when the vehicle is not in the caution area.

According to the information display system, the execution of the guidance processing is suppressed when an object or a person is present in the vicinity the vehicle. This prevents the driver from paying more attention to a display unit than to the object or the person. When no object or person is present in the vicinity the vehicle, the information display system can execute the guidance processing to appropriately guide the driver's line of sight toward a display unit. The information display system can thus cause the driver to view a display unit in a more appropriate situation, which is when no object or person is present in the vicinity the vehicle.

According to the information display system, if the guidance processing includes display processing, the suppression of the execution of the guidance processing is prohibited, i.e., the guidance processing is executed, to cause the driver to pay attention to an object or a person outside the vehicle. The display processing is thus executed because it may contribute to effectively causing the driver to pay attention to the object or the person outside the vehicle. The information display system can thus cause the driver to view a display unit in a more appropriate situation.

According to the information display system, the suppression of the execution of the guidance processing is prohibited if the guidance processing includes display processing that involves processing for projecting an image onto the windshield of the vehicle. The information display system can thus cause the driver to view a display unit in a more appropriate situation.

According to the information display system, during continuous execution of the guidance processing, the guidance processing is suppressed if the duration of the guidance processing reaches a predetermined time period or greater. The driver may be gazing at an object different from a display unit toward which the guidance processing is attempting to guide the driver's line of sight. Continuing the guidance processing by the information display system in such a situation may obstruct the safe driving of the vehicle, and this can be avoided by preventing the execution of the guidance processing. The information display system can thus cause the driver to view a display unit in a more appropriate situation.

The present disclosure is not limited to the above-described embodiment but may be applicable to various embodiments without departing from the spirit of the present disclosure. For example, priority may be assigned to the content itself displayed on the display units, rather than to the display units. The guidance processing may then guide the driver's line of sight toward a display unit displaying content assigned with a higher priority.

Each of the elements in each of the above embodiments may be configured in the form of an exclusive hardware product, or may be realized by executing a software program suitable for the element. Each of the elements may be realized by means of a program executing unit, such as a Central Processing Unit (CPU) or a processor, reading and executing the software program recorded on a recording medium such as a hard disk or semiconductor memory. Such software realizing the information display system etc. according to the above-described embodiment is the following program.

In other words, a program causes a computer to execute a control method performed by an information display system that displays information on one or more display units included in a vehicle, the information display system executing guidance processing for guiding a line of sight of a driver of the vehicle toward a display unit which is not in the line of sight among the one or more display units, the control method including: obtaining vicinity information indicating a state of vicinity of the vehicle from a device outside the vehicle; determining whether or not the driver should pay more attention to the state of the vicinity of the vehicle indicated in the vicinity information than the information displayed on the one or more display units; and executing control for suppressing the execution of the guidance processing when it is determined in the determining that the driver should pay more attention to the state of the vicinity of the vehicle than the information displayed on the one or more display units.

Although the information display system etc. according to one or more aspects of the present disclosure have been described based on an embodiment, the present disclosure is not limited to this embodiment. Those skilled in the art will readily appreciate that embodiments arrived at by making various modifications to the above embodiment or embodiments arrived at by selectively combining elements disclosed in the above embodiment without materially departing from the scope of the present disclosure may be included within one or more aspects of the present disclosure.

FURTHER INFORMATION ABOUT TECHNICAL BACKGROUND TO THIS APPLICATION

The disclosure of the following patent application including specification, drawings, and claims is incorporated herein by reference in their entirety: Japanese Patent Application No. 2021-158363 filed on Sep. 28, 2021.

INDUSTRIAL APPLICABILITY

The present disclosure is applicable for systems that display information on display units in a vehicle.

The invention claimed is:

1. A control method performed by an information display system that displays information on one or more displays included in a vehicle, the information display system executing guidance processing for guiding a line of sight of a driver of the vehicle toward a display which is not in the line of sight among the one or more displays, the control method comprising:
obtaining vicinity information indicating a state of the vicinity outside the vehicle using a device external to the vehicle;
determining whether the driver should pay more attention to the state of the vicinity outside the vehicle, as indicated in the vicinity information, than to the information displayed on all the one or more displays; and
suppressing the execution of the guidance processing when determined the driver should pay more attention to, the state of the vicinity outside the vehicle, than to the information displayed on all the one or more displays.

2. The control method according to claim 1, wherein
the vicinity information includes position information of the vehicle, the determining includes:
determining whether or not the position information indicates that the vehicle is within a predetermined caution area; and
determining that the driver should pay more attention to the outside of the vehicle than the information displayed on all the one or more displays, when the position information indicates that the vehicle is within the predetermined caution area.

3. The control method according to claim 2, wherein
the predetermined caution area includes an area within a predetermined distance from at least one of an intersection, a pedestrian crossing, or a railroad crossing.

4. The control method according to claim 1, wherein
the vicinity information includes detection information obtained by a sensor provided in the vehicle,
the determining includes: determining whether or not the detection information indicates that an object or a person is present in the vicinity of the vehicle; and
determining that the driver should pay more attention to the state of the vicinity outside of the vehicle than the information displayed on all the one or more displays, when it is determined that the detection information indicates that the object or the person is present in the vicinity of the vehicle.

5. The control method according to claim 1, further comprising:
detecting the line of sight of the driver, wherein
the guidance processing includes display processing for displaying, on at least one of the one or more displays, an image for causing the driver to pay attention to an object or a person which is present at a position which is outside the vehicle and out of the line of sight of the driver, and the guidance processing is suppressed during the display processing even when the determining determines that the driver should pay more attention to the state of the vicinity outside of the vehicle than the information displayed on the one or more displays.

6. The control method according to claim 5, wherein the display processing includes processing for projecting, at or in a vicinity of a position on a windshield of the vehicle where the driver sees the object or the person present ahead of the vehicle through the windshield, the image for causing the driver to pay attention to the object or the person.

7. The control method according to claim 1, wherein the information display system repeatedly executes the guidance processing until the line of sight of the driver is directed to the display which is not in the line of sight of the driver among the one or more displays, and the control method further comprises suppressing the execution of the guidance processing when the guidance processing has been repeatedly executed for a predetermined time period or longer.

8. An information display system that displays information on one or more displays included in a vehicle, the information display system comprising:

a processor; and a memory including a program that, when executed by the processor, causes the processor to:

execute guidance processing for guiding a line of sight of a driver of the vehicle toward a display, which is not in the line of sight, among the one or more displays; and obtain vicinity information indicating a state of the vicinity outside the vehicle using a device external to the vehicle, wherein the processor:

determines whether the driver should pay more attention to the state of the vicinity outside the vehicle, as indicated in the vicinity information, than to the information displayed on all the one or more displays; and suppresses the execution of the guidance processing when determined the driver should pay more attention to, the state of the vicinity outside the vehicle, than to the information displayed on all the one or more displays.

* * * * *